US009594656B2

(12) United States Patent
Shafi

(10) Patent No.: US 9,594,656 B2
(45) Date of Patent: Mar. 14, 2017

(54) ANALYSIS AND VISUALIZATION OF APPLICATION CONCURRENCY AND PROCESSOR RESOURCE UTILIZATION

(75) Inventor: Hazim Shafi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 949 days.

(21) Appl. No.: 12/605,932

(22) Filed: Oct. 26, 2009

(65) Prior Publication Data

US 2011/0099554 A1    Apr. 28, 2011

(51) Int. Cl.
*G06F 9/46* (2006.01)
*G06F 11/30* (2006.01)
*G06F 11/32* (2006.01)
*G06F 11/36* (2006.01)

(52) U.S. Cl.
CPC ...... *G06F 11/3017* (2013.01); *G06F 11/3072* (2013.01); *G06F 11/32* (2013.01); *G06F 11/3664* (2013.01)

(58) Field of Classification Search
None
See application file for complete search history.

(56) References Cited

U.S. PATENT DOCUMENTS

| | | | |
|---|---|---|---|
| 5,168,554 A * | 12/1992 | Luke | G06F 11/323 714/E11.181 |
| 5,297,274 A | 3/1994 | Jackson | |
| 5,903,730 A | 5/1999 | Asai et al. | |
| 6,057,839 A | 5/2000 | Advani et al. | |
| 6,226,787 B1 | 5/2001 | Serra et al. | |
| 6,289,369 B1 | 9/2001 | Sundaresan | |
| 6,332,212 B1 * | 12/2001 | Organ et al. | 717/128 |
| 6,341,347 B1 * | 1/2002 | Joy et al. | 712/228 |
| 7,137,120 B2 | 11/2006 | Armstrong et al. | |
| 7,343,476 B2 | 3/2008 | Floyd et al. | |
| 7,353,370 B2 | 4/2008 | Rodgers et al. | |
| 7,426,731 B2 | 9/2008 | Findeisen | |
| 7,610,186 B2 | 10/2009 | Odhner et al. | |
| 8,418,148 B2 | 4/2013 | Shafi et al. | |
| 8,990,551 B2 | 3/2015 | Shafi | |
| 2002/0152305 A1 | 10/2002 | Jackson et al. | |

(Continued)

OTHER PUBLICATIONS

Dynamic Analysis and Profiling of Multi-threaded Systems Waddington et al.*

(Continued)

*Primary Examiner* — Tammy Lee
(74) *Attorney, Agent, or Firm* — Kevin Sullivan; Micky Minhas

(57) ABSTRACT

An analysis and visualization depicts how an application is leveraging computer processor cores in time. The analysis and visualization enables a developer to readily identify the degree of concurrency exploited by an application at runtime. Information regarding processes or threads running on the processor cores over time is received, analyzed, and presented to indicate portions of processor cores that are used by the application, idle, or used by other processes in the system. The analysis and visualization can help a developer understand contention for processor resources, confirm the degree of concurrency, or identify serial regions of execution that might provide opportunities for exploiting parallelism.

20 Claims, 3 Drawing Sheets

(56) References Cited

U.S. PATENT DOCUMENTS

| | | |
|---|---|---|
| 2003/0187929 A1 | 10/2003 | Pugh et al. |
| 2004/0210900 A1 | 10/2004 | Jones et al. |
| 2005/0104799 A1 | 5/2005 | Shimizu |
| 2006/0095917 A1 | 5/2006 | Black-Ziegelbein et al. |
| 2007/0220513 A1 | 9/2007 | Hwang |
| 2007/0250820 A1 | 10/2007 | Edwards et al. |
| 2007/0294693 A1 | 12/2007 | Barham |
| 2008/0098207 A1 | 4/2008 | Reid et al. |
| 2008/0189488 A1 | 8/2008 | DeWitt et al. |
| 2009/0063885 A1 | 3/2009 | Arimilli et al. |
| 2009/0089790 A1 | 4/2009 | Manczak et al. |
| 2009/0237404 A1 | 9/2009 | Cannon, III |
| 2009/0313633 A1 | 12/2009 | Nardelli et al. |
| 2009/0319996 A1 | 12/2009 | Shafi et al. |
| 2010/0223600 A1 | 9/2010 | Shafi et al. |
| 2011/0099550 A1 | 4/2011 | Shafi |
| 2012/0072758 A1 | 3/2012 | Shafi |

OTHER PUBLICATIONS

Visual Studio 2010 CTP Walkthroughts, Sep. 2008.*
"Visual Studio 2010 Beta 1: Parallel Performance Tools Overview", May 18, 2009, pp. 5.
Graham, Bill, "Software Visualization Tools to Optimize Multi-core Systems", Feb. 2007, pp. 3.
"Taking Parallelism Mainstream", Oct. 9, 2008, pp. 21.
Health, et al., "ParaGraph: A Tool for Visualizing Performance of Parallel Programs", Sep. 1, 1994, pp. 50.
Graham, et al., "Evaluation of a Prototype Visualization for Distributed Simulations", Proceedings of the 1998 Winter Simulation Conference, 1998, pp. 9.
Godin, et al., "Parallel Performance Visualization Using Moments of Utilization Data", Jun. 22, 2000, pp. 1-6.
"Parallel Performance Analysis, Visualization and Optimization" Sep. 18, 2009, pp. 4.
"IBM Toolkit for Data Collection and Visual Analysis for Multi-Core Systems", Retrieved at <<alphaworks.ibm.com/tech/dcva4j>> Oct. 2, 2008, pp. 1-2.
Matassa, et al.,"Best Practices: Adoption of Symmetric Multiprocessing Using VxWorks and Intel Multi-Core Processors", Retrieved at <<download.intel.com/technology/advanced_comm/ 321307.pdf>>Feb. 2009, pp. 1-20.
Waddington, et al., "Dynamic Analysis and Profiling of Multi-threaded Systems", Retrieved at <cs.wustl.edut/~schmidt/PDF/ DSIS_Chapter_Waddington.pdf>> 2007, pp. 1-32.
Ma, et al., "Delta Execution: A Preemptive Java Thread Migration Mechanism", Retrieved at <<i.cs.hku.hk/~fcmlau/papers/cluster00. pdf>> 2000,vol. 3, Issue 2, pp. 83-94.
"Visualization Tools Aid Multi-Core Development", Retrieved at <<embeddedtechmag.com/content/view/109/122/1/2/>> Jun. 5, 2007, pp. 1-2.
Shafi, Hazim, "Performance Pattern 2: Disk I/O", Retrieved at <<blogs.msdn.com/hshafi/>> Sep. 22, 2009, pp. 1-18.
Office Action for U.S. Appl. No. 12/605,947 mailed May 21, 2012 (10 pgs.).
Office Action for U.S. Appl. No. 12/605,947 mailed Nov. 30, 2012 (8 pgs.).
Final Office Action for U.S. Appl. No. 12/605,947 mailed Aug. 8, 2013 (7 pgs.).
Office Action for U.S. Appl. No. 12/605,947 mailed Mar. 7, 2014 (9 pgs.).
Final Office Action for U.S. Appl. No. 12/605,947 mailed Sep. 4, 2014 (9 pgs.).
"ThreadX", retrieved at <rtos.com/page/product.php?id=2 >>, pp. 6.
"Graphical Thread Dumps", retrieved at <<neuroning.com/articles/ 2005/11/24/graphical-thread-dumps>>, Nov. 25, 2005, pp. 3.
Office Action for U.S. Appl. No. 12/394,445 mailed Jan. 20, 2012 (12 pgs.).
Final Office Action for U.S. Appl. No. 12/394,445 mailed Jul. 13, 2012 (12 pgs.).
Notice of Allowance for U.S. Appl. No. 12/394,445 mailed Nov. 27, 2012 (11 pgs.).
Aron, et al., "Cluster Reserves: A Mechanism for Resource Management in Cluster-based Network Servers", Retrieved at <<citeseerx.ist.psu.edu/viewdoc/download?doi=10.1.1.92.917 &rep=rep1&type=pdf >>, Proceedings of the ACM Sigmetrics 2000 International Conference on Measurement and Modeling of the Computer Systems, Jun. 2000, pp. 12.
Medernach, Emmanuel, "Workload analysis of a cluster in a Grid environment", Retrieved at <<arxiv.org/PS_cache/physics/pdf/ 0506/0506176v1.pdf >>, Feb. 2, 2008, pp. 1-19.
Office Action for U.S. Appl. No. 12/883,859 mailed Apr. 23, 2013 (11 pgs.).
Hazim Shafi, "Visual Studio 2010 Beta 1: Parallel Performance Tools Overview", May 18, 2009.
Office Action for U.S. Appl. No. 12/883,859 mailed Oct. 29, 2013 (15 pgs.).
Final office Action for U.S. Appl. No. 12/883,859 mailed May 15, 2014 (8 pgs.).
Notice of Allowance for U.S. Appl. No. 12/883,859 mailed Nov. 7, 2014 (17 pgs.).
Office Action for U.S. Appl. No. 12/605,947 mailed Jul. 6, 2015 (20 pgs.).
Notice of Allowance for U.S. Appl. No. 12/605,947 mailed Apr. 20, 2016 (16 pgs.).
Final Office Action for U.S. Appl. No. 12/605,947 mailed Jan. 5, 2016 (14 pgs.).

* cited by examiner

ANALYSIS AND VISUALIZATION OF APPLICATION CONCURRENCY AND PROCESSOR RESOURCE UTILIZATION

BACKGROUND

Computer applications having concurrent threads and executed on multiple processors present great promise for increased performance but also present great challenges to developers. The growth of raw sequential processing power has flattened as processor manufacturers have reached roadblocks in providing significant increases to processor clock frequency. Processors continue to evolve, but the current focus for improving processor power is to provide multiple processor cores on a single die to increase processor throughput. Sequential applications that have previously benefited from increased clock speed obtain significantly less scaling as the number of processor cores increase. In order to take advantage of multiple core systems, concurrent (or parallel) applications are written to include concurrent threads distributed over the cores. Parallelizing applications, however, is challenging in that many common tools, techniques, programming languages, frameworks, and even the developers themselves, are adapted to create sequential programs.

To write effective parallel code, a developer often identifies opportunities for the expression of parallelism and then maps the execution of the code to the multiple core hardware. These tasks can be time consuming, difficult, and error-prone because there are so many independent factors to track. Current tools enable a developer to determine a percentage of processor use as a function of time. These tools are intended for sequential applications as the tools provide no meaningful insight on opportunities to express parallelism and provide no information on how processor cores are utilized. Understanding the behavior of parallel applications and their interactions with other processes that are sharing the processing resources of a computing device is a challenge with the current developer tools.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The present disclosure is directed to an analysis and visualization of how an application is leveraging computer processor cores in time. With the analysis and visualization, a developer can readily identify the degree of concurrency, or parallelism, exploited by an application at runtime, how it varies with time, and how other processes in the system may be interfering with it by contending for the processor cores. An example of the disclosure receives information regarding processes or threads running on the processor cores over time. The information is analyzed and presented to indicate portions of processor cores that are used by the application, idle, or used by other processes in the system to help a developer understand contention for processor resources and how it varies with time. The analysis and visualization can be implemented as a method, a software product, or as a system.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
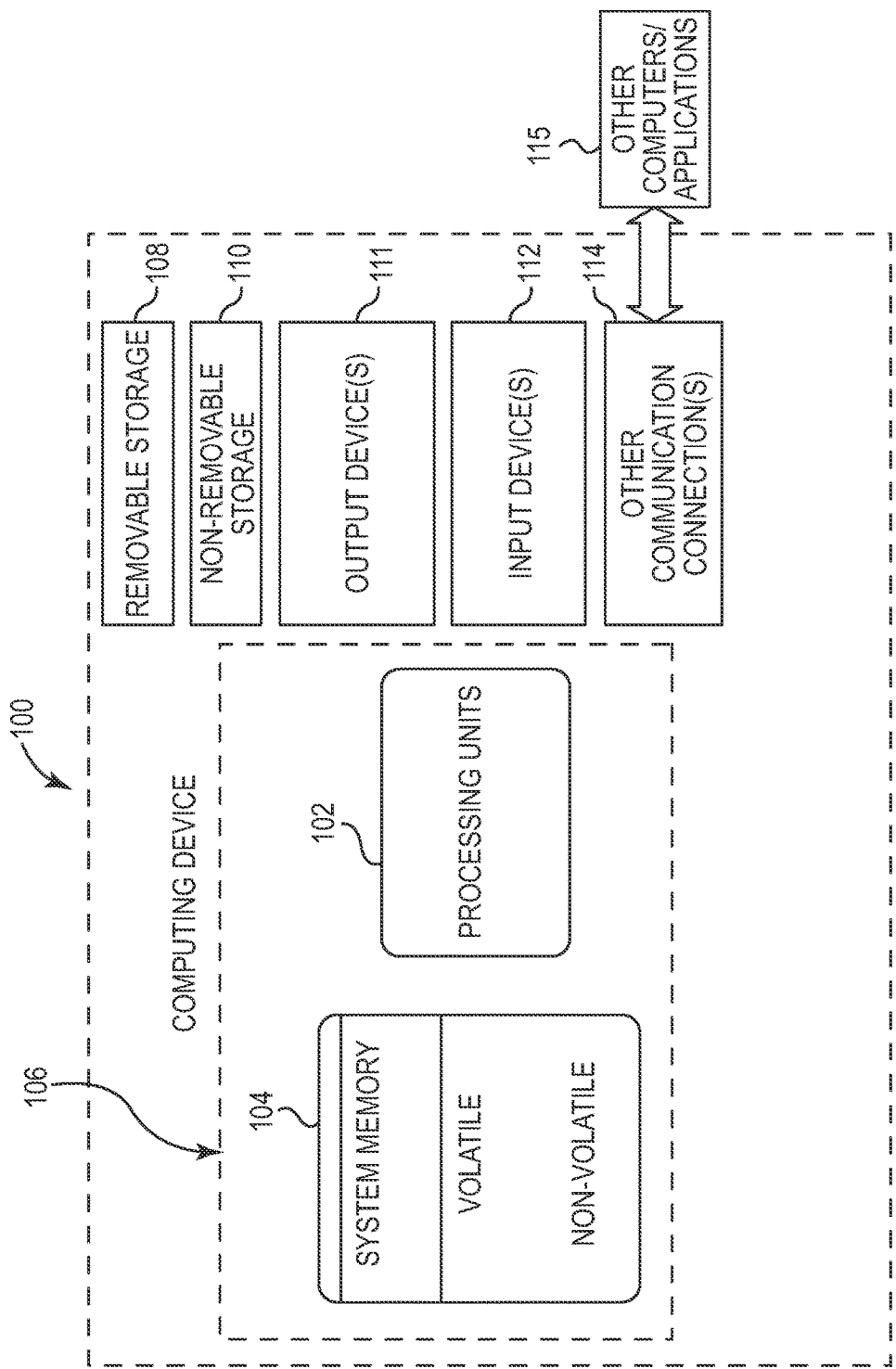
FIG. 1 is a block diagram illustrating an example computing device.

FIG. 1 illustrates an exemplary computer system that can be employed as an operating environment includes a computing device, such as computing device 100. In a basic configuration, computing device 100 typically includes a processor architecture having at least two processing units, i.e., processors 102, and memory 104. Depending on the exact configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a person computer, a server, a handheld device, a consumer electronic device (such as a video game console), or other.

Computing device 100 can also have additional features or functionality. For example, computing device 100 may also include additional storage (removable and/or non-removable) including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, or the like.

The computing device 100 can be configured to run an operating system software program and one or more software applications, which make up a system platform. In one example, the computing device 100 includes a software component referred to as a managed, or runtime, environment. The managed environment can be included as part of the operating system or can be included later as a software download. The managed environment typically includes pre-coded solutions to common programming problems to aid software developers to create software programs, such as applications, to run in the managed environment.

A computer application configured to execute on the computing device 100 includes at least one process (or task), which is an executing program. Each process provides the resources to execute the program. One or more threads run in the context of the process. A thread is the basic unit to which an operating system allocates time in the processor 102. The thread is the entity within a process that can be scheduled for execution. Threads of a process can share its virtual address space and system resources. Each thread can include exception handlers, a scheduling priority, thread local storage, a unique thread identifier, and a thread context (or thread state) until the thread is scheduled. A thread context includes the thread's set of machine registers, the kernel stack, a thread environmental block, and a user stack in the in the address space of the process corresponding with the thread. In parallel applications, threads can be concurrently executed on the processor 102.

Figure 2:
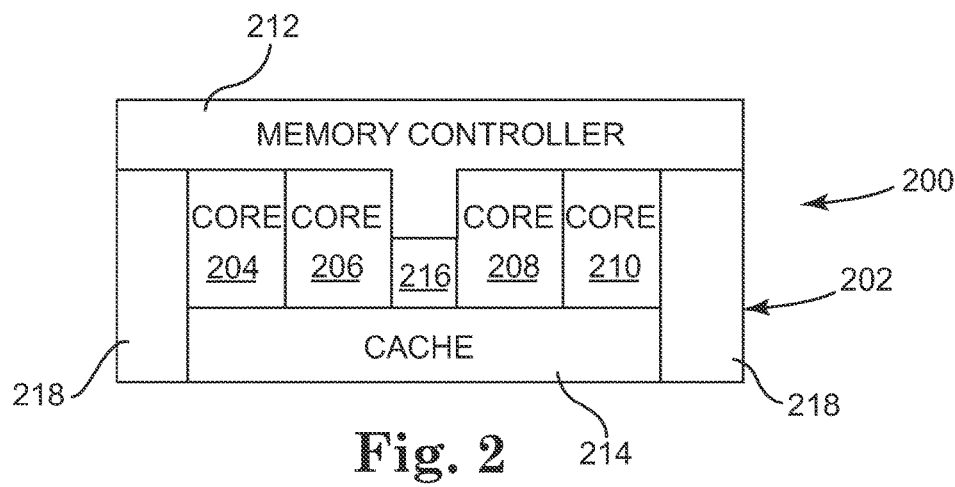
FIG. 2 is a schematic diagram illustrating an example of a multiple core processing system of the computing device of FIG. 1.

FIG. 2 an example multiple core processor 200 that can be implemented in the computing device 100 as processor 102 to concurrently execute threads. This example includes multiple cores implemented on a single die 202. Other examples are contemplated where the processor 102 exists on separate chips or even separate computer system, and the like. The example of FIG. 2 includes four physical processor cores 204, 206, 208, 210, or simply four physical cores, where each of the physical cores is available to process at least one application thread concurrently with at least one other physical core processing another thread. The physical cores 204, 206, 208, 210, are adjacent to a memory controller 212 and a cache 214 on the die 202 as shown. An example of the cache can include a shared level-three cache. In the example die 202, a queue 216 is disposed the die between the memory controller 212 and the cache 214. The illustrated configuration is representative of chip including processors currently available under the designation "Nehalem" available from Intel Corp. of Santa Clara, Calif. The die 202 can include other features 218 or combination of features such as a memory interfaces, miscellaneous input/output blocks, proprietary interconnects, expansion card interfaces, and the like.

In the example, each physical core is capable of efficiently and concurrently executing multiple threads of a concurrent process. Such physical cores are often referred to as "Simultaneous Multi-Threading," or often simply "SMT," cores, and the concurrently executed threads on each physical core share hardware resources included within the single physical core. In the example of the multiple core processing system 200, each physical core is capable of multithreading. Multithreading technology aims to increase core efficiency through thread-level and instruction-level parallelism. Each physical core capable of multithreading, or the like, can present the operating system with as many logical cores as concurrently executing threads it supports. In the example multiple core processing system 200, each physical core 204, 206, 208, 210 is capable of concurrently executing two threads, and thus provides the operating system with eight concurrent logical cores. The computing device 100 can theoretically execute as many concurrent threads as there are logical cores in the device 100. In one example of an operating system, the operating system available under the designation "Windows 7" from Microsoft of Redmond, Wash., supports more than sixty-four logical cores on a single computing device 100.

Parallelizing applications in the environments of FIGS. 1 and 2 can be challenging. Without adequate information on the opportunities for or the effects of parallelizing, a concurrent application can suffer from significant inefficiencies that could be difficult to address. For example, a developer parallelizing a sequential application could be interested in processor-bound regions or periods of time (or sections of code) where there does not appear to be much processor activity. This may be indicative of stalls due to input/output functions that could be corrected once identified. In another example, a developer of a parallelized application may not realize expected speeds or efficiency in running the application. Additional examples are contemplated.

Figure 3:
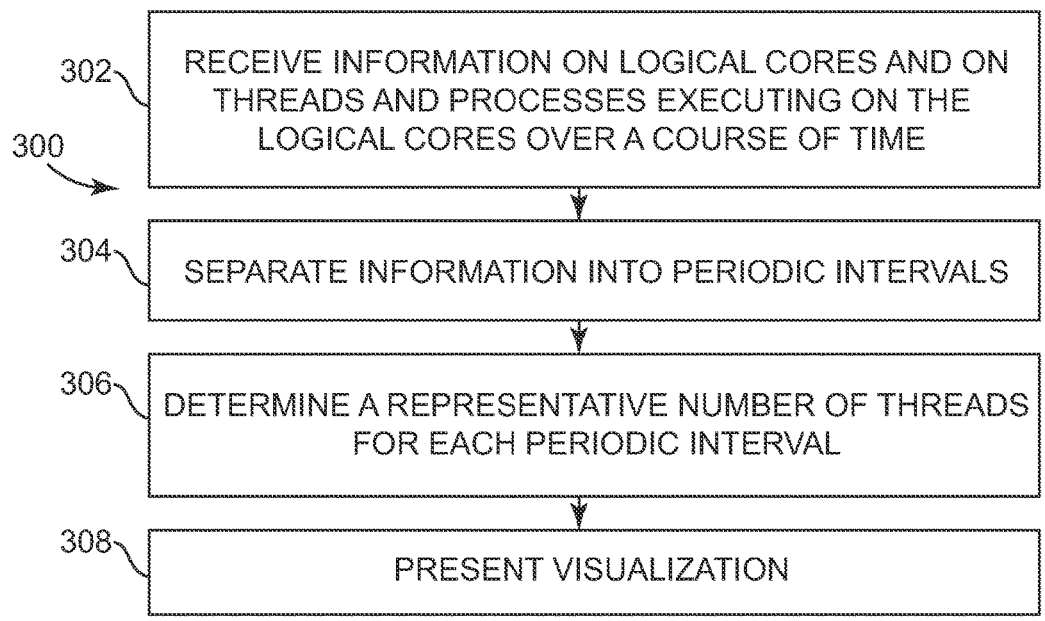
FIG. 3 is a block diagram illustrating an example method of visualization used with the multiple core processing system of FIG. 2.

FIG. 3 illustrates an example method 300 of determining use of logical cores in a concurrent process vis-à-vis other running processes on the multiple core processing system 200 over the course of time. Information regarding the number of available logical cores as well as information regarding threads and the processes which they belong to executing on the logical cores are received into the method at 302. In one example, the operating system interrogates the hardware to determine the number of logical cores available in a multiple core processing system 200. Also in 302, information on threads or processes of an application of interest (such as the application being developed or parallelized), information on the idle process, and information on the system process or other processes is received. This information gathered over the course of time can be separated into periodic intervals at 304. These periodic intervals can include equal periods of time or another measurement. For each interval, a representative number of executing threads is determined for each received process at 306. For example, the representative number could be an average number of threads executing at once over the interval for each process, but other representative numbers are possible. The representative number of logical cores for each process over the course of the period is presented to the developer as a visualization at 308. In one example, this visualization can include a graph.

Method 300 can be implemented as a tool to be run on the computing device 100. In one example, the tool is a software program or part of a software package. The software program can be included in a computer readable storage medium storing computer executable instructions for controlling a computing device, such as computing device 100, to perform the method 300. In one example, the tool can be a part of an integrated development environment, or IDE. The IDE can include a code editor, a compiler, build tools, a debugger and other tools for developing and testing an application. An example of an IDE is available under the trade designation "Visual Studio" from Microsoft. The software program can also be a separate product that can be used with one or more IDE packages or as a stand-alone product.

Information regarding the number of threads or processes executing on the logical cores can be determined through analyzing context switches in one example of 302. A context switch is a process of storing and restoring the state (context) of the multiple core processor 200 such that multiple processes or threads can share a single resource or operate concurrently. The context switch can be included as a feature of a multitasking operating system operating on the multiple core processor 200. A context switch can include a register context switch, a task context switch, a thread context switch, or a process context switch and is determined with the processor and the operating system. In the present example, a thread context switch is used.

A high-speed tracing facility can be used to generate context switch events. In one example, tracing is provided by the operating system running on the multiple core processor 200, although other methods of receiving context switch events is possible. In the present example, a trace can be enabled for a duration of time as part of 302, and each context switch event can be recorded as a context switch record. One example of a tracing mechanism is designated as "Event Tracing for Windows," or "ETW," which is included in many operating systems available from Microsoft.

In one example, a context switch record includes a timestamp, process identifier, and thread identifier for both the thread that is being removed and the thread that is being scheduled, among other information. The context switch record can be analyzed to determine information regarding the process of interest, the idle process, the system process, and any other processes running during the execution of the process of interest. The context switch records can be analyzed to determine information regarding concurrently executing processes and information associating threads to the concurrently executing processes. The analysis can determine a list of threads executing within each process. Also, the analysis can determine the start and stop times of the threads throughout the duration of the trace as well as the number of concurrent threads executing at any given time during the duration of the trace.

The information obtained from the context switch data is analyzed and processed at 304, 306 because context switches can occur at a high frequency in time, and providing an instantaneous visualization of core use is often noisy or difficult to read. In one example, the information gathered during the duration of a selected portion of the trace (such as the entire trace or a portion less than the entire trace) can be separated into periodic intervals, such as equal intervals of time, sections of code, or some other periodic intervals occurring over the course of time. The other processes running during the execution of the process of interest can also be separated into the same periodic intervals. A representative number of executing threads corresponding with logical cores is determined for the periodic interval. In a first example, the representative number includes the average number of executing threads for each process over the course of the periodic interval. Examples of the representative number can include the mean, median, mode, standard deviation, peak, or some other representative number of the number of executing threads over the course of the logical interval.

In one particular example, the method 300 analyzes the context switch events in the trace for the process of interest, the idle process, and the system process (other processes could also be supported). Through examining the context switches, the method determines all time intervals during which one or more threads from a given process were running. The duration of the trace is divided into equal sized periodic intervals, such as one-thousand periodic intervals of equal time over the duration of the trace. For each of these intervals, the method determines the average number of threads that were executing at the time. The average number can be a non-integer because the operating system can perform context switches at a fine granularity in time. The method generates an area graph that displays this average number of threads executing for the process being analyzed, the idle process, and the system process. Because the method has determined the total number of cores in the system, the remaining utilization is attributed to the other processes running on the system.

Figure 4:
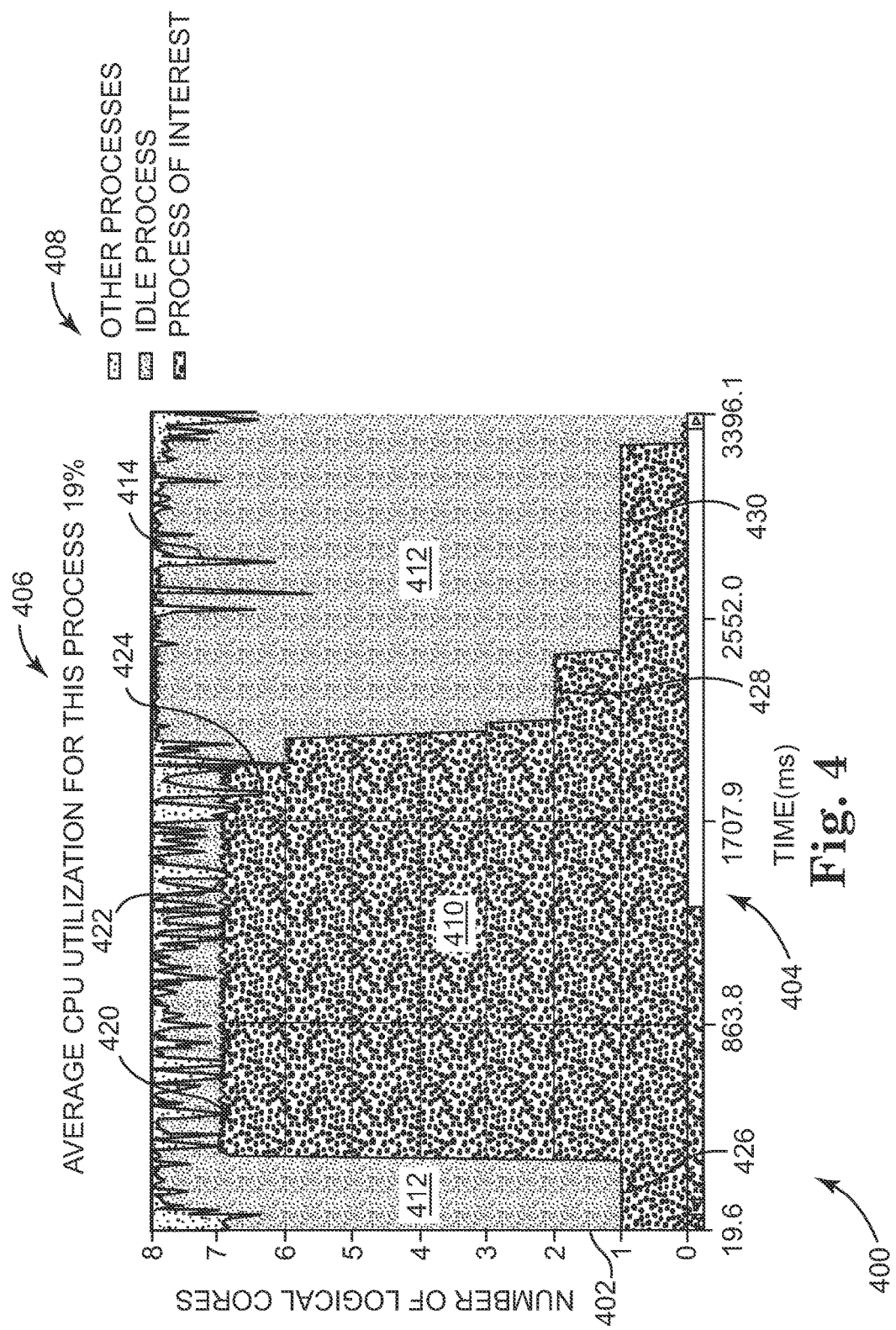
FIG. 4 is a graph illustrating an example output of the method of FIG. 3.

FIG. 4 illustrates an example area graph 400 that can be used to present the number of logical cores against the duration of the trace in the example above. Area graph 400 includes an axis 402 for the number of logical cores in the processor 102. Area graph 400 also includes an axis for time 404 over the duration of the trace, which can be expressed in milliseconds. In some examples, the graph can indicate the percentage of processor utilization 406, a legend 408, or other information that can be of help to the user. In this example, the number of logical cores used by the process of interest over the course of the trace is represented with area 410. The number of logical cores used by idle process over the course of the trace is represented with area 412. The number of logical cores used by the system process over the course of the trace is negligible, and doesn't appear on this scale. Thus the remaining number of logical cores over the course of the trace is attributed to the other processes and represented with area 414.

Additional features can be included with the visualization to allow the developer to gain a more detailed understanding of identified issues and to correct them. For example, regions of the graph can be magnified or provided with more resolution and additional details. Analysis and visualization can be limited to specific regions of code. Also, the visualization can be linked with application code such that issues identified on the graph can be readily addressed with modifications to the code. Some or all of these additional features, as well as others, can be included in the method or tool itself, or can be included with an IDE and integrated into the method.

Review of the area graph 400 can help a developer understand contention for processor resources and how it varies with time. The developer can obtain meaningful insight on opportunities to express parallelism and information on how processor cores are utilized. The developer can identify serial regions, or regions with small degrees of parallelism, wherein addition areas of parallelism might be exploited. The developer can also confirm a desired degree of parallelism in at least a portion of code. Further, the developer can also determine areas of interference with or contention for processor resources from other processes running on the cores. For example, the regions of the graph where the process of interest and the other processes are in close proximity to each other, such as at 420, 422, 424, and so on, suggests contention for processor resources, which can result in slow execution of the process of interest. The areas where few cores are utilized, such as 426, 428, 430, and so on, suggest opportunities for more parallelism. The method can provide an understanding of the behavior of parallel applications and their interactions with other processes that are sharing the processing resources of a computing device, which can thus be used to improve parallel programming.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computing device implemented method, comprising:
   receiving a plurality of context switch records and a total number of logical cores in a processing system, the context switch records are generated by recording context switches developed from executing a plurality of threads of at least one selected process in a concurrent application;
   extracting from the context switch records a number of the logical cores used to perform the at least one selected process over a course of time;
   separating the course of time into periodic intervals;
   determining a representative number of logical cores executing the selected process for each of the periodic intervals;
   presenting the representative number of logical cores executing the selected process for each of the periodic intervals against the total number of logical cores over the course of time to display contention for processor resources and how the contention for processor resources varies with time identifying varying degrees of parallelism in the at least one selected process; and
   identifying corresponding sections of code executing the selected process for modification.

2. The method of claim 1 wherein the plurality of context switch records are determined with an enabled trace conducted over a duration of the trace.

3. The method of claim 1 wherein the context switch records include information regarding concurrently executing processes and information associating threads to the concurrently executing processes.

4. The method of claim 1 wherein the context switch records include context switch events.

5. The method of claim 4 wherein the context switch records are representative of threads executing in the selected process.

6. The method of claim 5 wherein the representative number includes the average number of concurrently executing threads in the selected process over the course of the periodic interval.

7. The method of claim 1 wherein the selected process includes at least two separate selected processes.

8. The method of claim 7 where in the at least two separate selected processes includes a process of interest, an idle process, and a system process.

9. The method of claim 1 wherein a number of a logical cores used to perform other processes are determined from subtracting the number of the logical cores used to perform the selected process from the total number of logical cores at a given time.

10. The method of claim 1 wherein the representative number of logical cores for each of the periodic intervals against the total number of logical cores over the course of time is presented in an area graph.

11. A computer readable storage medium, which does not includes a transitory propagating signal, storing computer executable instructions for controlling a computing device to perform a method comprising:
    receiving a plurality of context switch records and a total number of logical cores in a processing system, the context switch records are generated by recording context switches developed from executing a plurality of threads in at least one selected process of a concurrent application;
    extracting from the context switch records a number of the logical cores used to perform the selected process over a course of time;
    extracting from the context switch records a number of the logical cores used to perform an idle process over a course of time;
    separating the course of time into periodic intervals;
    determining a representative number of logical cores executing each of the selected and idle processes for each of the periodic intervals;
    determining a representative number of logical cores executing other processes for each of the periodic intervals;
    presenting the representative number of logical cores executing the selected process, the idle process, and the other processes for each of the periodic intervals against the total number of logical cores over the course of time to display contention for processor resources and how the contention for processor resources varies with time identifying regions of contention in the at least one selected process in a visualization; and
    linking corresponding sections of code of the selected process for modification to the visualization.

12. The computer readable storage medium of claim 11 wherein the total number of logical cores in the processing system are received by causing an operating system to interrogate the processing system.

13. The computer readable storage medium of claim 11 wherein a trace is enabled over a duration of time in the operating system to receive the plurality of context switch records.

14. The computer readable medium of claim 13 wherein the separating the course of time into periodic intervals includes separating the duration of time into equal intervals of time.

15. The computer readable storage medium of claim 11 further including an integrated development environment.

16. The computer readable storage medium of claim 15 wherein integrated development environment includes a code editor, a compiler, build tools, and a debugger.

17. The computer readable storage medium of claim 15 wherein the presenting includes providing a link to additional information in regarding the concurrent processes in the integrated developer environment.

18. The computer readable storage medium of claim 11 wherein determining the representative number of logical cores executing other processes for each of the periodic intervals includes subtracting the sum of the representative numbers of the logical cores used to perform the selected process and the idle process from the total number of logical cores for a given periodic interval.

19. A system, comprising:
a processor;
a memory storing instructions executable by the processor to:
receive a plurality of context switch records, the context switch records are generated with a trace recording context switches and developed from executing a plurality of threads in at least one selected process of a concurrent application over a duration of time;
separate the duration of time into equal periodic intervals of time;
extract from the context switch records a number of the plurality of logical cores used to perform the selected process over the duration of time;
extract from the context switch records a number of the logical cores used to perform an idle process over the duration of time;
extract from the context switch records a number of the logical cores used to perform a system process over the duration of time;
determine a representative number of logical cores executing each of the selected process, idle process, and system process for each of the periodic intervals of time;
determine a representative number of logical cores executing other processes for each of the periodic intervals of time including subtracting the sum of the representative numbers of the logical cores used to perform the selected process, the idle process, and the system process from the total number of logical cores for a given periodic interval of time;
present the representative number of logical cores executing the selected process, the idle process, the system process, and the other processes for each of the periodic intervals in an area graph to display contention for processor resources and how the contention for processor resources varies with time and identify degrees of parallelism in the area graph; and
link corresponding sections of code available for modification to user-selected portions of the area graph.

20. The system of claim 19 and further comprising linking additional details to user-selected portions of the area graph.

* * * * *